United States Patent
Ferris

(10) Patent No.: US 9,764,841 B2
(45) Date of Patent: Sep. 19, 2017

(54) MULTI-POSITION ADJUSTABLE SUPPORT ASSEMBLY SUSPENDED FROM AN ELEVATED HORIZONTAL EDGE FOR SECURING SUCH AS A BOOK, SMARTPHONE OR TABLET STYLE COMPUTER

(71) Applicant: Robin C. Ferris, Waterford, MI (US)

(72) Inventor: Robin C. Ferris, Waterford, MI (US)

(73) Assignee: Robin C. Ferris, Waterford, MI (US)

( * ) Notice: Subject to any disclaimer, the term of this patent is extended or adjusted under 35 U.S.C. 154(b) by 28 days.

(21) Appl. No.: 14/939,954

(22) Filed: Nov. 12, 2015

(65) Prior Publication Data

US 2016/0257404 A1     Sep. 8, 2016

Related U.S. Application Data

(60) Provisional application No. 62/128,368, filed on Mar. 4, 2015.

(51) Int. Cl.
*B64D 11/00* (2006.01)
*F16M 11/04* (2006.01)
(Continued)

(52) U.S. Cl.
CPC ..... *B64D 11/00152* (2014.12); *F16M 11/041* (2013.01); *F16M 11/10* (2013.01); *F16M 13/00* (2013.01); *F16M 13/022* (2013.01); *H04M 1/04* (2013.01); *A47B 23/02* (2013.01); *B60R 7/043* (2013.01); *B60R 11/0252* (2013.01); *B60R 2011/0015* (2013.01);
(Continued)

(58) Field of Classification Search
CPC ... B60N 3/004; B60D 11/00152; B60R 7/043; B60R 2011/0015; B60R 2011/0017; B60R 2011/0276; B60R 11/0241; B60R 11/02; B60R 11/0252; B60R 11/0258; B60R 2011/0294; Y10S 224/929–224/93; B64D 11/00152; A47B 23/02
USPC ............... 224/275, 564–566, 282, 502, 553, 224/929–930; 248/294.1, 308, 398, 371, 248/166, 188.8, 188.91, 242; 403/79, 72, 403/70, 94
See application file for complete search history.

(56) References Cited

U.S. PATENT DOCUMENTS 3,488,026 A * 1/1970 Elwell ..................... B60R 1/078
248/231.41
3,986,649 A   10/1976 Heimstra
(Continued)

*Primary Examiner* — Scott McNurlen
(74) *Attorney, Agent, or Firm* — Dinsmore & Shohl LLP

(57) ABSTRACT

An assembly for supporting a device from a structural location exhibiting an upper horizontal edge. A main support body has front and rear faces, a bottom support ledge projecting from the front face and being adapted to receive a bottom extending edge of the device. A top support ledge extends from the rear face and is adapted to engage the upper horizontal edge of the structural location. A variant of the assembly incorporates a height adjustable component secured to the main support body and exhibiting a further ledge support location adapted to engage a top extending edge of the device. An angularly adjustable arm supporting component is secured to a lower rear face location of the main support body and is adjustable to establish a desired angle or tilt of the main support body and supported device.

8 Claims, 7 Drawing Sheets

(51) Int. Cl.
*H04M 1/04* (2006.01)
*F16M 11/10* (2006.01)
*F16M 13/00* (2006.01)
*F16M 13/02* (2006.01)
*B60R 7/04* (2006.01)
*B60R 11/00* (2006.01)
*B60R 11/02* (2006.01)
*A47B 23/02* (2006.01)

(52) U.S. Cl.
CPC  *B60R 2011/0294* (2013.01); *F16M 2200/024* (2013.01); *Y10S 224/929* (2013.01)

(56) References Cited

U.S. PATENT DOCUMENTS

| | | | |
|---|---|---|---|
| 4,293,113 A * | 10/1981 | Gray | A01K 97/10 224/482 |
| 4,949,924 A | 8/1990 | Carmody | |
| 5,443,018 A * | 8/1995 | Cromwell | B60N 3/004 108/44 |
| 5,738,319 A | 4/1998 | Grassi | |
| 5,988,572 A | 11/1999 | Chivallier et al. | |
| 6,209,767 B1 | 4/2001 | Liou | |
| 6,240,667 B1 | 6/2001 | Harney et al. | |
| 7,219,867 B2 | 5/2007 | Kalis et al. | |
| 7,318,366 B2 * | 1/2008 | Lee | B25B 13/461 403/93 |
| 7,740,312 B2 | 6/2010 | Johnson, Jr. | |
| 7,861,985 B2 | 1/2011 | Galvin | |
| 8,353,490 B2 | 1/2013 | Spinelli | |
| 2005/0077333 A1 * | 4/2005 | Caradimos | B60R 11/0252 224/276 |
| 2007/0164987 A1 | 7/2007 | Graham | |
| 2008/0051160 A1 | 2/2008 | Seil et al. | |
| 2008/0121774 A1 | 5/2008 | Johnson | |
| 2009/0288123 A1 | 11/2009 | Havlovick et al. | |
| 2010/0078536 A1 | 4/2010 | Galvin | |
| 2012/0235001 A1 * | 9/2012 | Somuah | B60R 11/0235 248/287.1 |
| 2012/0312847 A1 * | 12/2012 | LaColla | B60R 11/02 224/275 |

\* cited by examiner

MULTI-POSITION ADJUSTABLE SUPPORT ASSEMBLY SUSPENDED FROM AN ELEVATED HORIZONTAL EDGE FOR SECURING SUCH AS A BOOK, SMARTPHONE OR TABLET STYLE COMPUTER

CROSS-REFERENCE TO RELATED APPLICATIONS

This Application claims the benefit of U.S. Provisional Application 62/128,368 filed on Mar. 4, 2015, the contents of which is incorporated in its entirety.

FIELD OF THE INVENTION

A multi-positional support assembly capable of being secured or suspended from an elevated location not limited to an elevated horizontal edge associated with a foldable airline seatback tray. The assembly includes a height and/or angularly adjustable main support body adapted to receive in cradling and supporting fashion any of a book, smartphone, tablet computer or the like.

BACKGROUND OF THE INVENTION

Hands-free supporting devices, such as for use with normally hand-held objects are known in the art. A first example of this is disclosed in U.S. Pat. No. 7,861,985, to Galvin, which teaches an electronic device holder having a flexible adjustable gooseneck, the proximal end of which carries a tab having two spring pins that securely engage with a pocket member. A securing/attachment means secures the pocket member to the backside of the handheld electronic device. A distal end of the flexible gooseneck connects to a spring clip similar to a clothes line pin, which attaches the hands-free electronic device holder to an airline dining tray or a worktable.

US 2014/0048662, to Ferris, teaches an article supporting device secured to an elevated location and in turn supporting an item such as a computer tablet. A hinged and foldable body has first and second pivotal sections each depicting a "U" shaped cross sectional profile and convertible between a collapsed/storage configuration and an extended/use configuration in which the sections establish a continuous and three sided support surface. A pair of suspending hooks extend upwardly from spaced apart locations along the body for engaging a vertical extending (seatback tray) support edge. Depth adjustable abutment portions located beneath the hooks establish proper angular orientation in use. Laterally adjustable and vertically extending brackets support vertical edges of the item placed upon the support surface.

U.S. Pat. No. 7,740,312, to Johnson, Jr. teaches a collapsible/storable drink holder assembly mountable above an airline table tray, such as a sufficient distance to accommodate a laptop computer seated upon the tray, and including a support extending downwardly from the drink holder. A mounting mechanism connected to the support removably mounts the drink holder on the tray.

Other references of note include Graham, US 2007/0164987 which teaches a hands-free support apparatus configured so as to be mounted to the human anatomy. Chivallier, U.S. Pat. No. 5,988,572, teaches a cradle device for a portable radio terminal also supported in gooseneck adjustable fashion to a flat surface. A further class of bracket style supporting or suspending devices is shown in each of Spinelli, U.S. Pat. No. 8,353,490, Grassi, U.S. Pat. No. 5,738,319, Heimstra, U.S. Pat. No. 3,986,649, and Carmody, U.S. Pat. No. 4,949,924.

SUMMARY OF THE INVENTION

The present invention discloses an assembly for supporting any type of object or device, not limited to a book, tablet, smartphone, etc, from a structural location, further not limited to a seatback structural support, exhibiting an upper horizontal edge. A main support body is provided and exhibits front and rear faces, a bottom support ledge projecting from the front face and being adapted to receive a bottom extending edge of the article, object, or device. A top support ledge extends from the rear face and is adapted to engage the upper horizontal edge of the structural location.

An angularly adjustable bracket is secured to the rear face, typically at one or more lower locations, and is adjustable to establish a desired angle or tilt of the main support body and supported device relative to the structural support surface (e.g. seatback surface). A further non-limiting variant of the assembly incorporates a height adjustable component secured to the main support body and exhibiting a further ledge support location adapted to engage a top extending edge of the device. The height adjustable component may further include any of a strap or other flexible attachment structure, such as for countering the effects of turbulence when utilized in an airplane setting and which may otherwise stress or fracture a plasticized suspending portion as a result of material bend or creep.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 12:
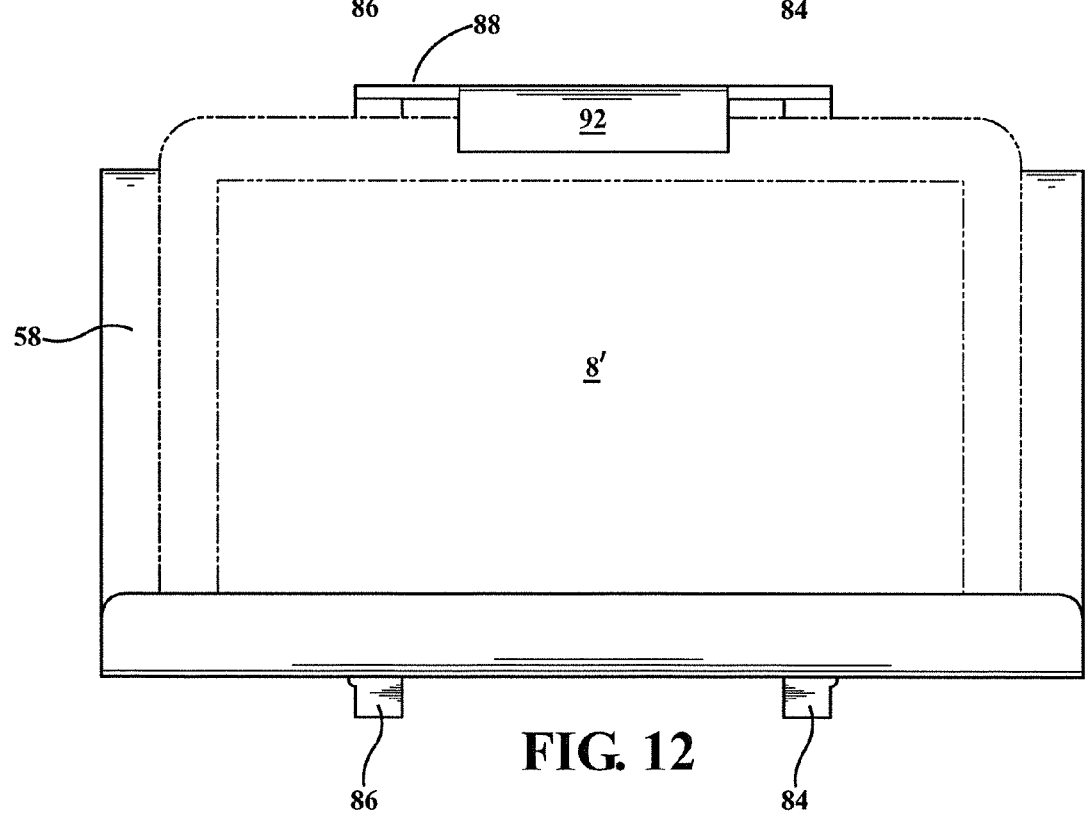
FIG. 12 is a succeeding front plan view of another variant of FIG. 7 for securing a further alternately sized electronic device.

As will be subsequently described in more detail with reference to FIGS. 1-12, the present invention discloses an assembly capable of being secured or suspended from an elevated location not limited to a foldable airline seatback tray 2 of a conventional airline seat 4 (see FIG. 1) for providing hands free support of any object such as including but not limited to a book (not shown), a smartphone 6 (FIG. 11) or other generally rectangular shaped article including a computer tablet device, examples of which are shown at 8 in FIGS. 7-8 and at 8' in FIG. 12. As will be described with reference to attached illustrations the depicted variants of the present assembly are constructed of either two or three main components, such as which can be produced from any suitable material not limited to a lightweight metal or a durable plastic.

As will be further described certain components of the present designs, which can include the uppermost portions engaging a horizontal support edge (see at 10 in FIG. 1) of the seatback tray 2 when pivoted to an upright position against the associated seatback 4, this may include reconfiguring the horizontal ledge engaging portions of the support device to include a strap (not shown) or of providing the upper engaging portions thereof as a rubberized or flex material. As will be also further described, this construction can counter the effects of fracture or creep, and such as which may be particular to certain types of plastics which are either under constant or alternating (cycling) loading forces.

Referring collectively to FIGS. 1-6, a first variant of the support device is depicted at 12 and includes a substantially rectangular and planar shaped main body with a front face 14 and an opposite rear face 16. An extending and device support ledge is provided and includes a bottom most forward extending portion 18, an upwardly angled portion 20 and an upper end surface 22, these defining an inner horizontal support surface 24 (FIGS. 1 and 3), upon which the book, electronic device or other article may be supported.

A pair of upper most extending hook shaped portions are depicted at 26 and 28, these projecting from opposite upper edge locations of the main body. As best shown by selected hook portion 26 in the side view of FIG. 3, the hook shaped portion terminates in an end surface 30 (see also at 31 for corresponding hook 28 in FIG. 4) and defines an underside seating surface 32 for supporting the article 12 upon the horizontal ledge extending surface 10 of the seatback tray 2 (see again FIG. 1). As further previously noted, the hook shaped portions 26 and 28 can be substituted by any of a strap or other loop shaped fastener (not shown), or may be configured of any rubberized or flex-type material which provides adequate loading support to the combined weight of the device 12 and any associated object (again at 6, 8, 8') and while counter the effect of material fracture or creep which may result from constant or alternating loading cycles applied to plasticized angled edges of the hook portions.

In order to provide angular orientation of the assembly body relative to the horizontal ledge supporting surface 10, a bracket is provided secured to the rear face 16. As best shown in FIGS. 3-6, the bracket includes in one non-limiting application a "U" shaped body with a base component 34 interconnecting first 36 and second 38 extending legs, these further terminating in rubberized or other frictional engaging pads 40 and 42.

Figure 1:
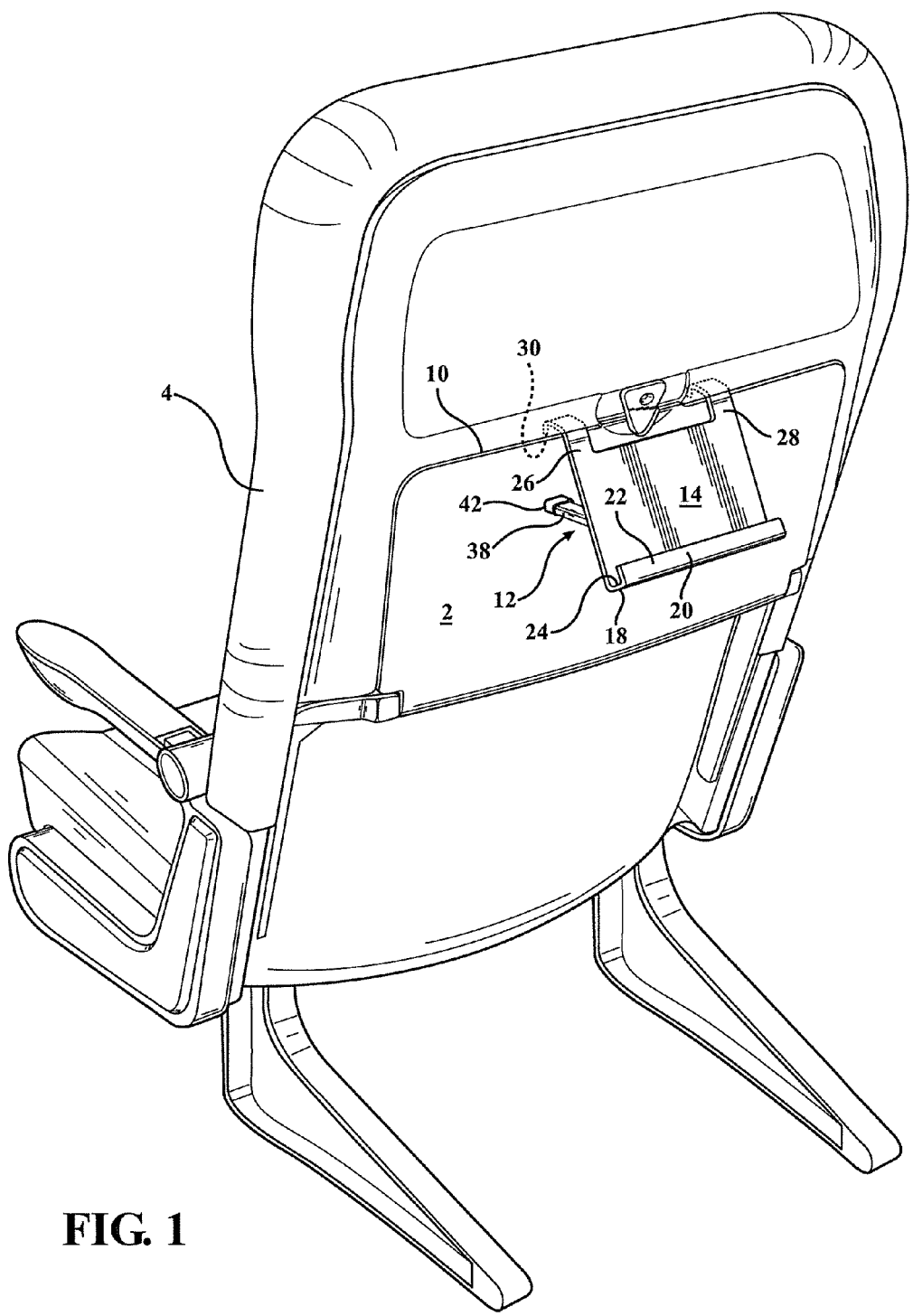
FIG. 1 is an environmental perspective of the article supporting device according to a first embodiment, and which is depicted secured to an elevated horizontal support surface in the form of an airline, train or coach seatback tray in a vertical stowed position.
Figure 2:
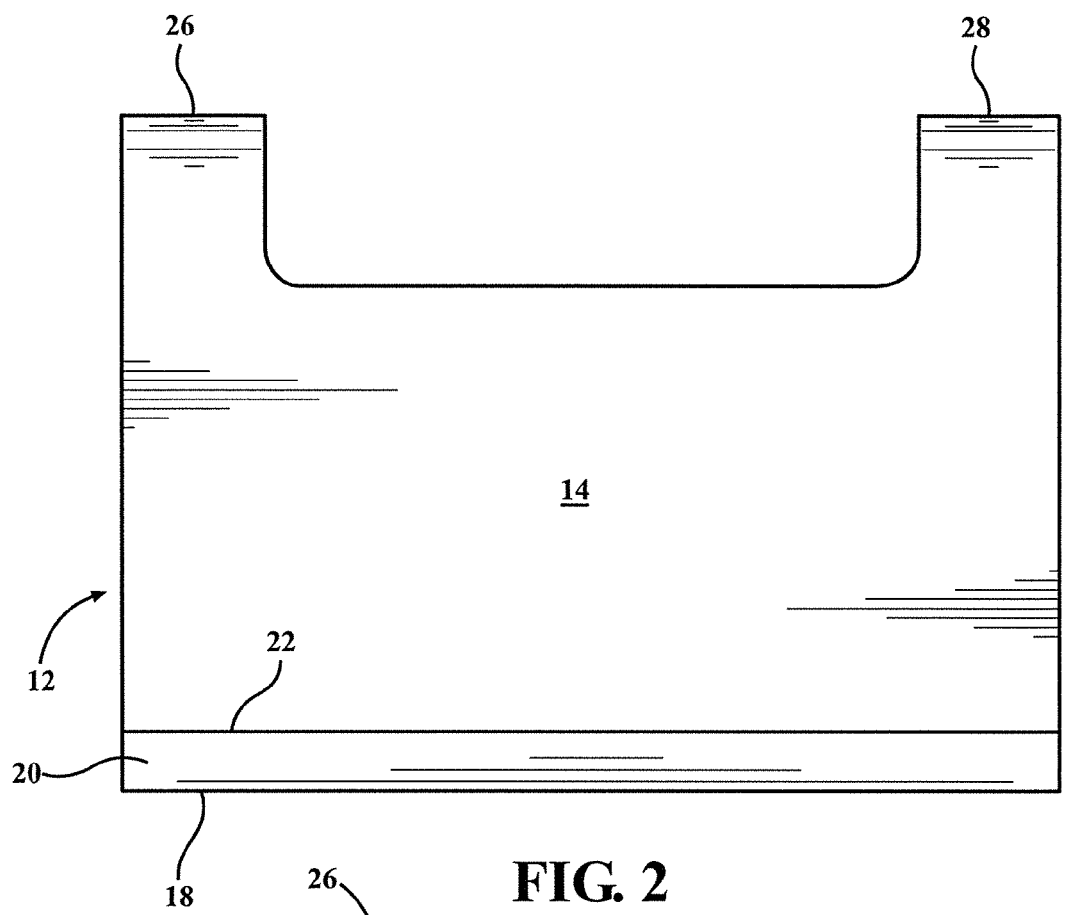
FIG. 2 is a front plan view of the article supporting device shown in FIG. 1 and illustrating a pair of upwardly extending engaging tabs in combination with the article/device supporting bottom ledge.
Figure 3:
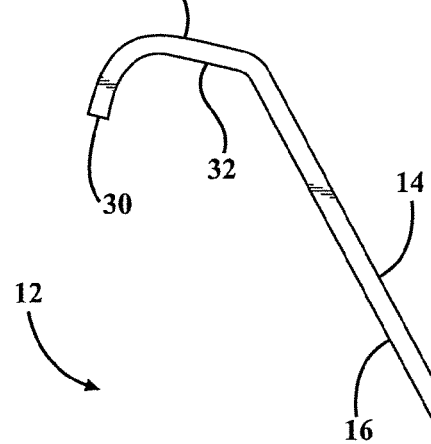
FIG. 3 is side view of the device and further showing the angularly adjustable bracket secured to the rear face, and which is adjustable to establish a desired angle or tilt of the main support body and supported device relative to the structural support surface.
Figure 3:
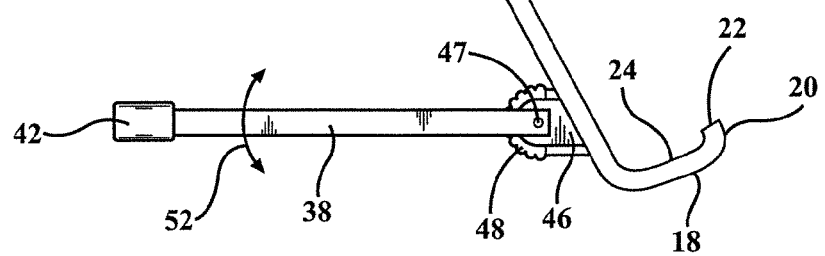
Figure 4:
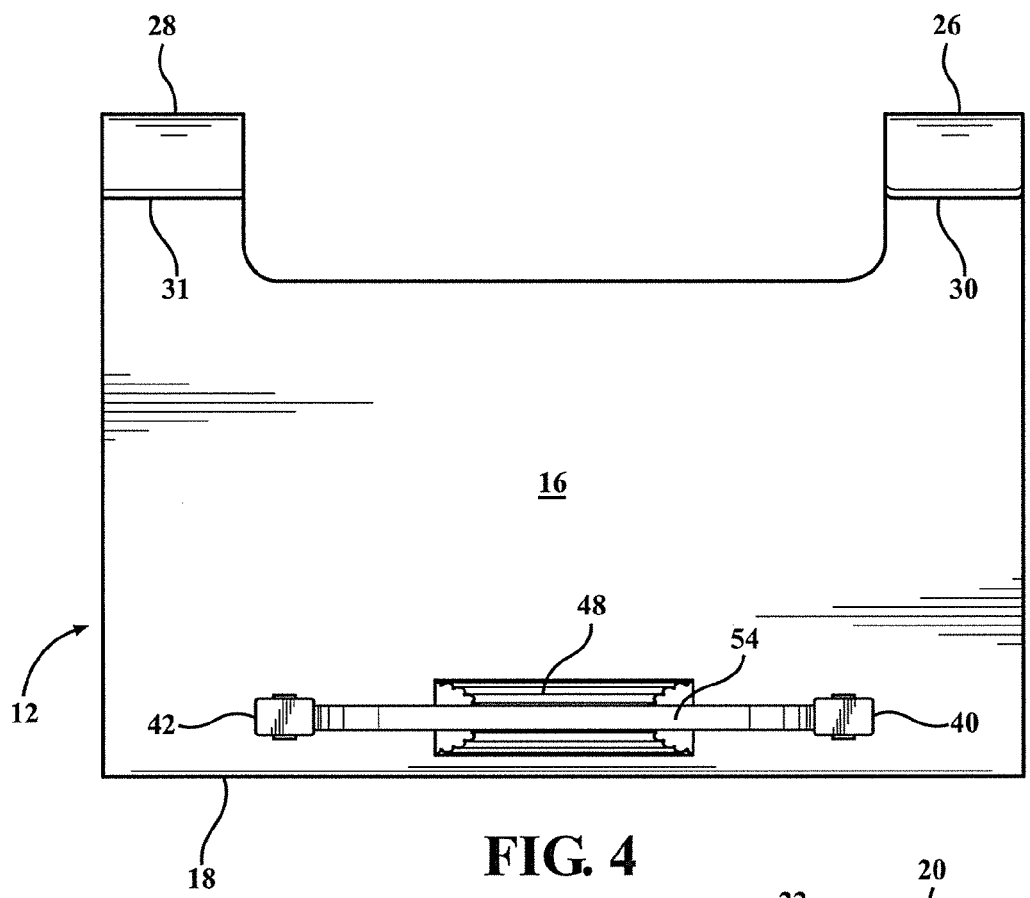
FIG. 4 is a rear plan view of the article supporting device.
Figure 5:
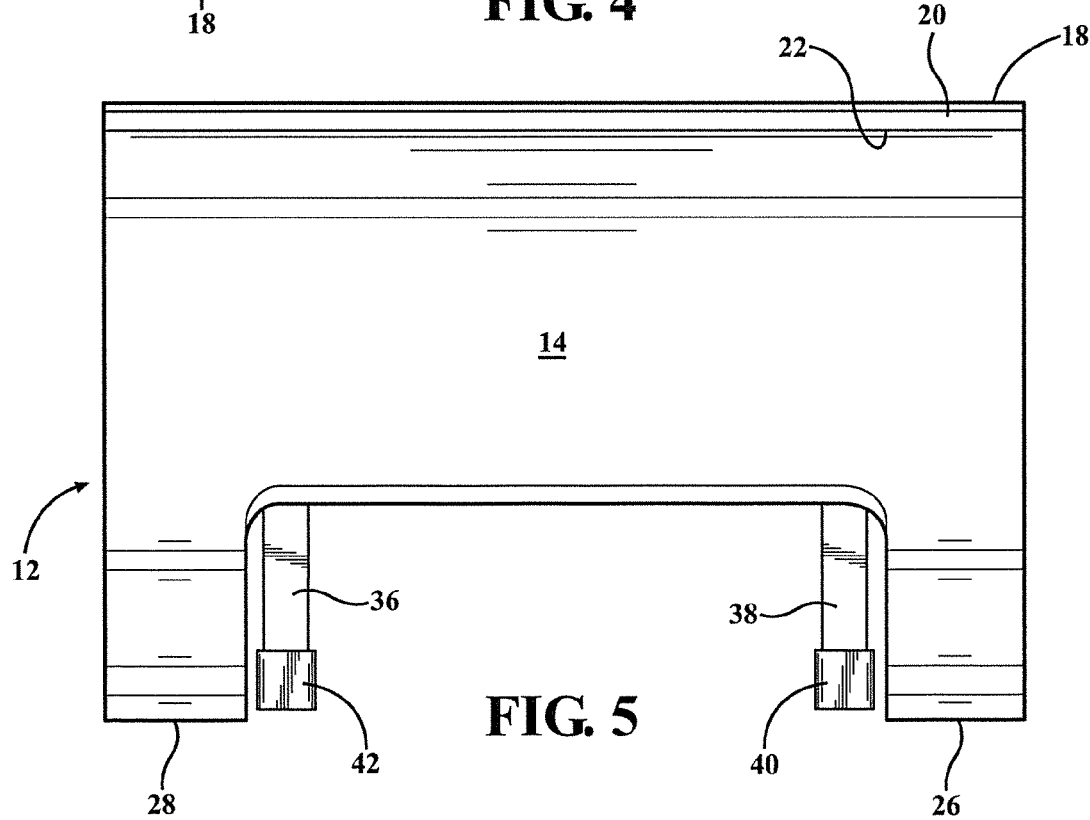
FIG. 5 is a rotated front plan view of the article supporting device also shown in FIG. 2.
Figure 6:
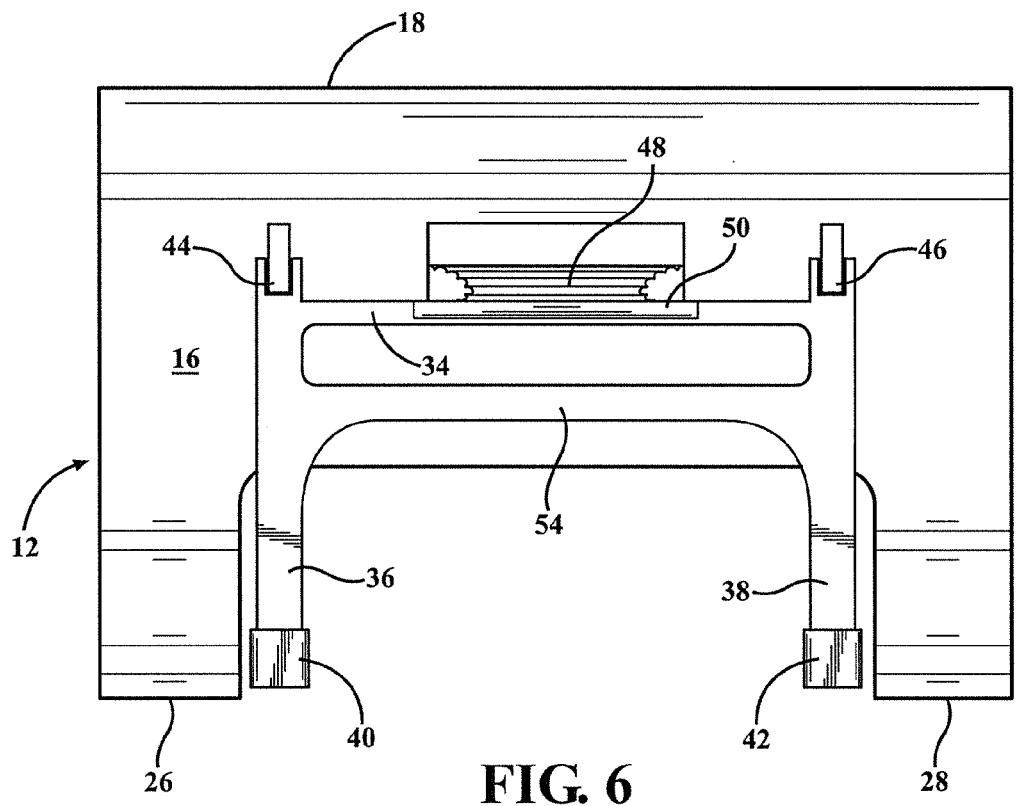
FIG. 6 is a rotated rear view of the article supporting device shown in FIG. 5 and better illustrating an overall "U" shape associated with the angularly adjustable bracket.

As further best shown in FIG. 6, one non-limiting configuration of the bracket includes a pair of coaxial supports 44 and 46, these defining pivot locations as further device at 47 for associated support 46 in FIG. 3) for pivotally mounting base locations of the legs 36 and 38 to the rear face 16 of the main planar body. Additional features may include an arcuate (such as semi-circular) profile 48, such as best shown in FIGS. 3 and 6, this engaging a rear extending central location 50 of the base 34 (FIG. 6) for providing ratchet style angular adjustment of the bracket (see arrow 52 in FIG. 3).

The dimensioning of the pivot locations 44 and 46 relative to the contact locations established between the inner edge portion 50 and ratchets 48 may be configured to provide a desired tactile engaging support profile allowing the bracket to securely and predictably angularly adjust over given angular increments, and without damage to the assembly or loss of holding support. Additional components such as springs or other biasing members can be integrated into the interface between the bracket and the main body (such perhaps permitting the bracket to be first extended, angularly adjusted, and released to lock into place) without departing from the scope of the invention, and in this fashion, the angle established between the body and the seatback tray 2 can be easily adjustable. Also shown in FIG. 6 is a reinforcing cross member 54 extending between intermediate locations of the spaced apart legs 36 and 38 and which, in combination with the base component 34, provides additional structural support to the bracket.

Figure 7:
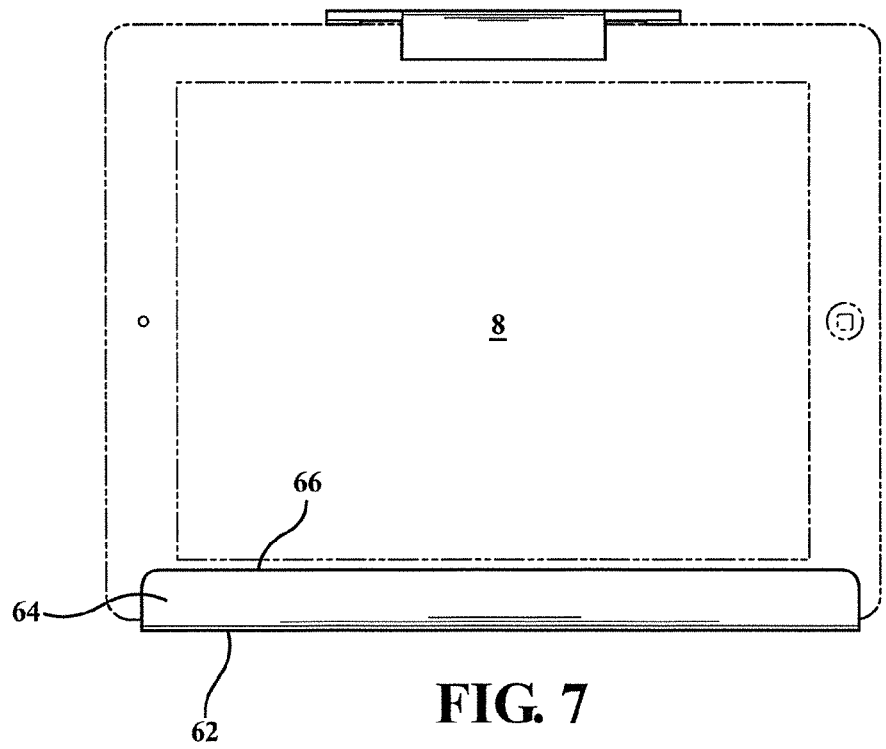
FIG. 7 is an environmental plan view of the article supporting device according to a second non-limiting embodiment and which depicts an electronic tablet device supported between top and bottom ledges of the device.
Figure 8:
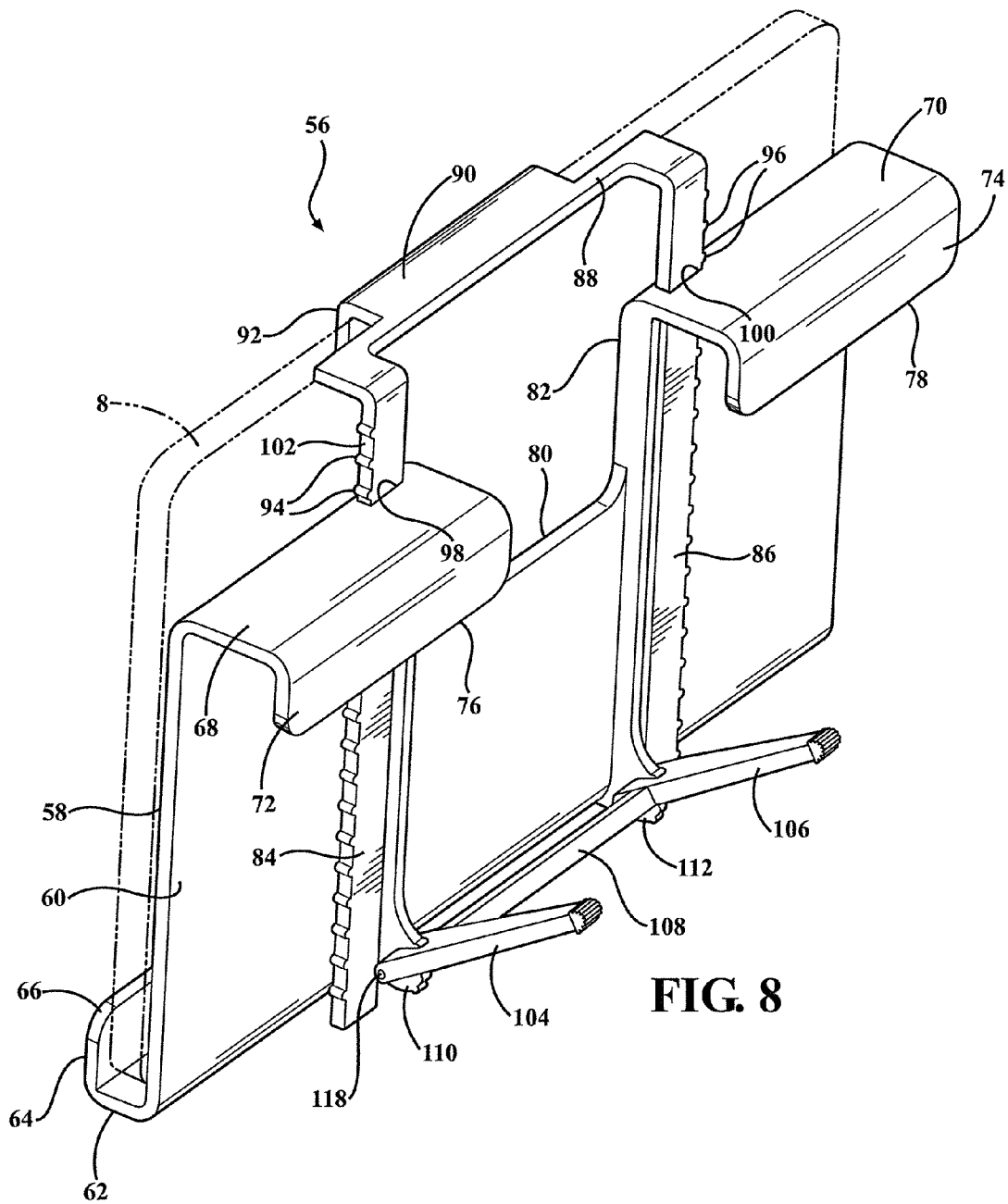
FIG. 8 is a perspective view of the article supporting device of FIG. 7 and illustrating both its height adjustable component and angularly adjustable bracket in varying positions.
Figure 9:
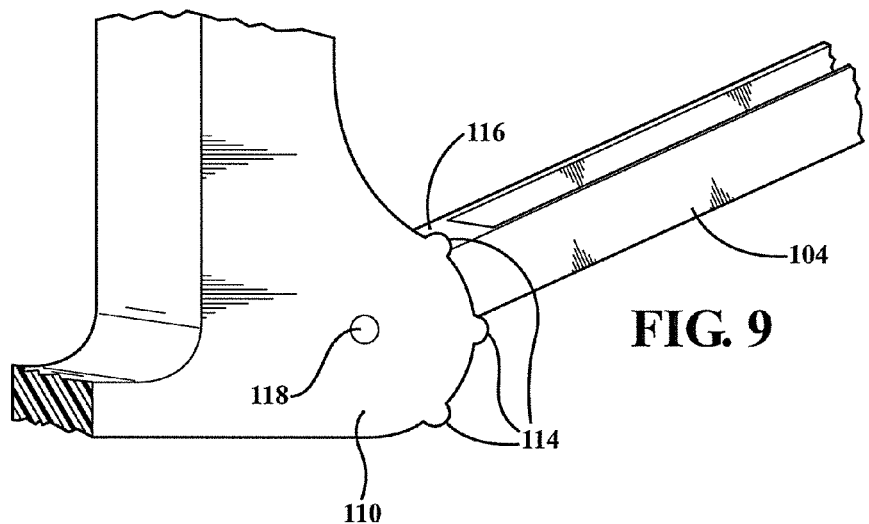
FIG. 9 is an enlarged side partial view of an engagement location of a selected portion of the "U" shaped bracket and better showing an inwardly biased and inter-fitting arrangement established between arcuate/undulating ratchet surfaces and an inner engagement end associated with a selected arm extending portion of the bracket.
Figures 10A, 10B, 10C:
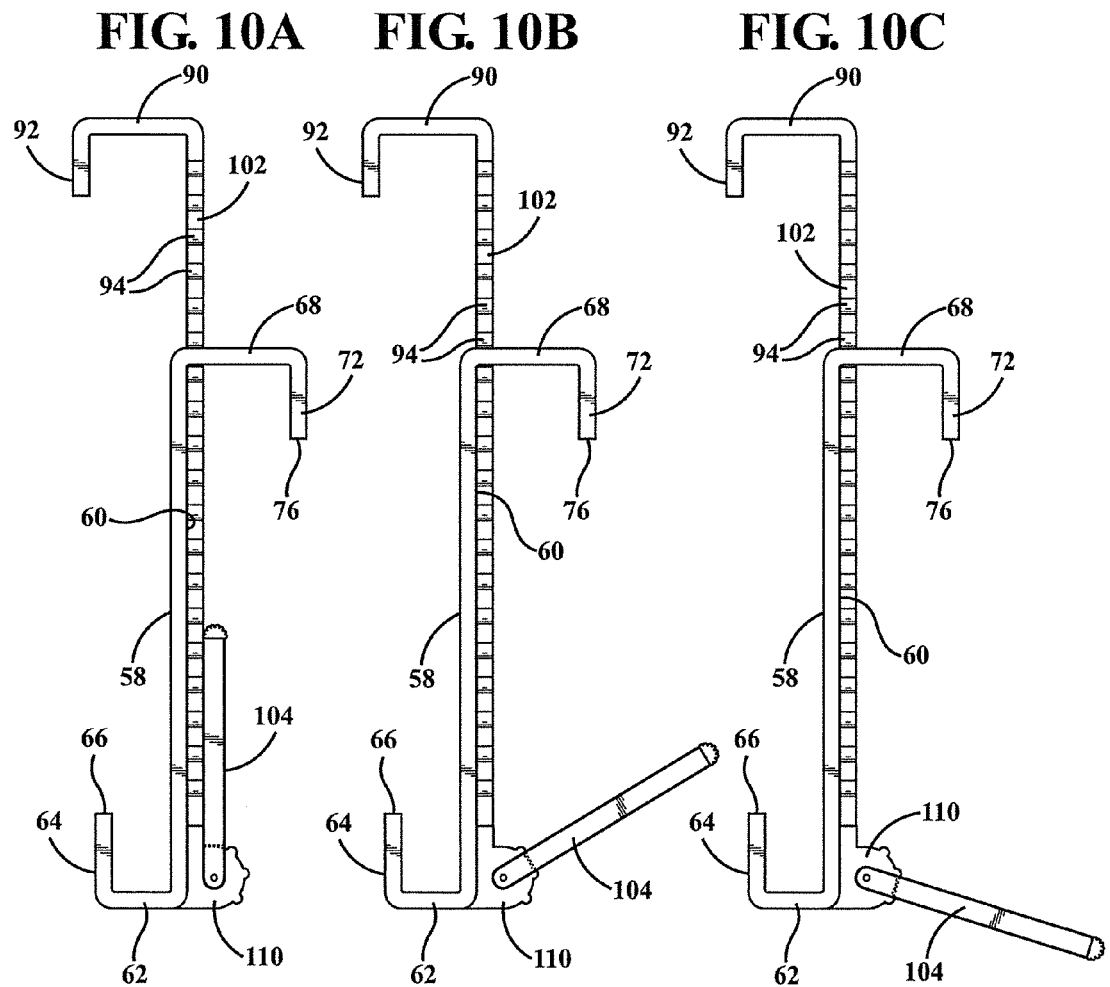
FIGS. 10A-10C illustrate successive side plan views of the device of FIG. 7 in which the angularly adjustable bracket is depicted in varying positions relative to the rear side of the main support body.
Figure 11:
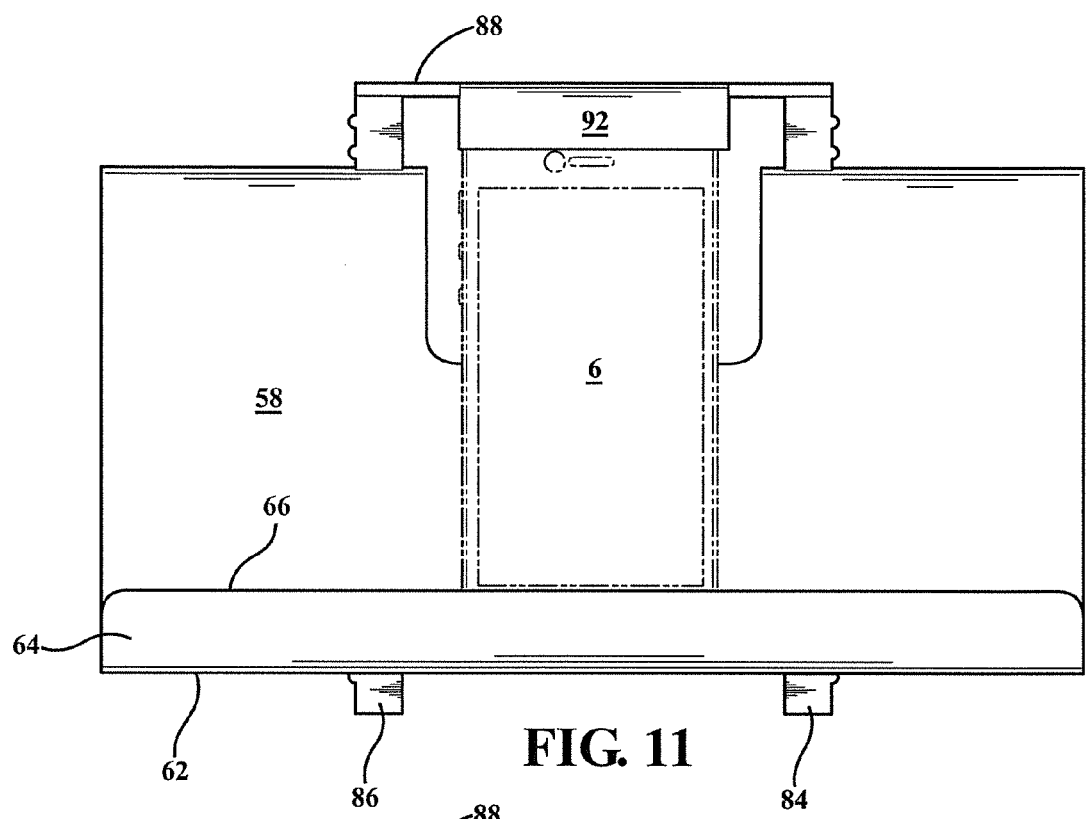
FIG. 11 illustrates in front plan view a variant of FIG. 7 for securing a smaller sized electronic device.

Referring now to FIGS. 7-12, a series of illustrations are provided of an article supporting device, generally at 56, according to a second non-limiting embodiment and which depicts the electronic tablet device, e.g. at 8 in FIGS. 7-8, supported between top and bottom ledges of the device. As with the initially described embodiment 12, a generally planar and rectangular shaped main support body is provided with front 58 and rear 60 faces, and which is adapted to receive in cradling and supporting fashion any of a book, smartphone, tablet computer or the like.

As further shown in the perspective view of FIG. 8, a bottom support for the book, smartphone 6 or tablet 8 is established by the combination of a continuous and upwardly angled lip, see sides 62, 64 and upper end surface 66, which extends from the front face 58 of the main support body. A pair of upper and opposite (rear) extending suspending supports (similar to the brackets 26 and 28 in the first embodiment) are provided by integrated hook portions established by rear projecting surfaces 68 and 70 (from rear face 60), interconnecting downwardly projecting lip portions 72 and 74, and terminating end surfaces 76 and 78. These collectively define the hook portions which secure to and suspend the assembly from the horizontal support edge 10 of the upright seatback tray (or other elevated support surface) and, as described in reference to the initial embodiment, the hook portions can be substituted by other structure (straps) or can incorporate rubberized flex or other properties to avoid long term material wear or fracture.

The downwardly projecting lip portions 72/74, which respectively extend from the top extending and rearwardly projecting surfaces 68 and 70, extend in spaced apart fashion from top edges of the main support body, again in a direction away from the rear face 16. As with the bottom edge and upwardly angled lip, the upper edge and reverse facing/downwardly angled lips each exhibit a generally "U" shape in cross section. Further, and while the upper suspending ledges are shown in spaced apart fashion separated by a recessed cutout (see sides selected side edges 80 and 82 in FIG. 8 with a third interconnecting side edge hidden from view) in the upper end of the main support body, it is further envisioned that the upper suspending supports can include a single continuous defined ledge similar to that depicted by the lower device supporting ledge (interconnecting surfaces 62 and 64). In this fashion, the bottom edge of the device (see again smartphone 6 or tablet 8 or 8') is adapted to being supported upon the inside of the bottom ledge 62 of the body and partially restrained by the upwardly angled lip 64, this concurrent with the rearwardly facing/reverse angled upper ledges 68/72 and 70/74 suspended upon the upper horizontal edge 10 of the seatback supported tray 2.

Attached in adjustable fashion to the main support body of FIG. 8 is a second incrementally height adjustable component and which includes a three sided construction with a pair of ribbed and parallel extending elongated legs 84 and 86, these interconnected by an inter-extending top 88. The top 88 further exhibits a device top edge engaging location defined by an extending ledge 90 terminating in a downwardly angled lip 92.

The spaced apart ribs (see as shown at 94 for leg 84 and at 96 for leg 86) associated with each of the extending legs 84 and 86 are configured to abut in a biasing fashion inside closed perimeter edges (further at 98 and 100, respectively) configured in spaced apart upper end locations of the main support body, these located proximate to the front face 58 and extending through the upper ledges 68 and 70 and defining inner apertures through which the legs 84 and 86 are resistively and ratchet-adjustably mounted. The spacing between each pair of ribs (see further at 102 as best shown for leg 84) is equivalent to the thickness of the ledges 68 and 70 in order to provide for a secure and tactile engagement.

In this manner, and upon ratchet extending or retracting the crosswise extending and upper interconnecting portion 88 and associated ledge 90/92 into the desired engaging position with the smartphone or tablet, the device is adequately grasped along its upper edge and, in combination with the bottom lip edge support 62/64, is prevented from falling or slipping out of engagement with the assembly. As further shown, the legs 84 and 86 are dimensioned to generally the height of the main support body, such as in order to accommodate easy storage in the fully retracted position.

A third component is provided by an angularly and multi-positional pair of arms, these being shown at 104 and 106 and separated by a crosswise extending base 108. A pair of support locations associated with the main support body are provided in the form of arcuate lobes or projecting portions 110 and 112 extending from spaced apart and lower edge proximate locations of the rear face 60.

The pivotally supported arms 104 and 106 are each mounted to the arcuate lobe portions 110 and 112. FIG. 13 is depicted in partial cutaway with the spaced apart mounting portions (see at 58 and 60 in FIG. 11 for selected arm 48) removed. As further best shown in the partial cutaway of FIG. 13, pin 62 corresponds to a support shaft extending between each pair of mounting portions 58/60 which is mounted in coaxial fashion through a width extending recess in each of the lobes 54/56.

A plurality of ribbed locations, see at 114 in FIG. 13, are configured in circumferentially offsetting fashion about the projecting arcuate edge of each lobe 110 and 112. End abutting locations of each leg (see at 116 in FIG. 13) are configured to seat against the arcuate portion separating each pair of circumferentially offset ribbed locations 114. In a preferred variant, the arms 104 and 106 are spring loaded into a biasing engagement against the supporting lobes 110 and 112, such springs being hidden from view however which are understood as being capable of being integrated into the construction of the hinged arrangement.

By example, the hinged arrangement can include the pivot locations, shown at 118 for selected arm 104, being elongated to permit the arm 104 to be extended in a linear direction prior to angularly adjusting and reseating between a pair of arcuately offset ribbed locations 114. As previously described, the configuration of the pivotal connecting interface between the arm and the ribbed lobes can further be such that the arms are angularly ratchet adjustable without being otherwise linearly displaced.

Although not shown, one envisioned adjustment protocol can include without limitation either or both of hollowed interior locations associated with the arms 104 and 106 incorporating a coil spring anchored to an inside location of each arm at a first end and hooked to a pin at a second end associated with the pivotal location 118. The compressing forces of the springs force an inside end face of the arm to resistively abut the angle defining locations established about the circumference of the lobes 110 and 112.

In this fashion, the arms are pivotally attached to the rear facing side of the main support body, such that the adjustability of the arms defines angular repositioning of the main support body for establishing an optimal viewing angle of the supported article. To this end, and referencing each of FIGS. 10A-10C, each of three adjustment settings FIG. 10A (flush), FIG. 10B (first angularly adjusted) and FIG. 10C (second angularly adjusted) are respectively established for varying the angular offset or tilt of the main support body and supported device.

Referring to FIG. 16, a lower rear facing perspective is shown of a main support body 12' according to a further variant and in which a third (intermediate) angular ratchet support 74 is integrated into the pivotal interface between the support body and a smooth outer edged pair of lobes 76 and 78. As additionally shown in succeeding FIG. 17, an arcuate reconfigured plurality of ribbed or undulating and ratchet defining surfaces 80 are provided.

As described, any reconfiguration of the arms can incorporate any desired spring loaded internal linkage for drawing inwardly against the main support body and its associated lobes and intermediate ratchet support. This can include the provision of a third intermediate support (not shown) positioned between a reconfigured outer pair of supporting lobes and which provides the only ratchet defining contact location for easier adjustability. In such a variant, the inside supporting surface of a suitably configured cross wise extending portion can be associated with the pair of reconfigured support arms 48' and 50', such exhibiting a protuberant seating location for assisting in achieving angular adjustability.

Having described my invention, other and additional preferred embodiments will become apparent to those skilled in the art to which it pertains and without deviating from the scope of the appended claims.

I claim:

1. An assembly for supporting a device from a structural location exhibiting an upper horizontal edge, said assembly comprising:

a main support body having front and rear faces, a bottom support ledge projecting from said front face and adapted to receive a bottom extending edge of the device, at least one top support ledge extending from said rear face and adapted to engage the upper horizontal edge;

a height adjustable component secured to said main support body and exhibiting a further ledge support location adapted to engage a top extending edge of the device;

said height adjustable component further including a three sided construction with a pair of ribbed and parallel extending elongated legs interconnected by an inter-extending top having an edge engaging location defined by an extending ledge terminating in a downwardly angled lip;

pluralities of spaced apart ribs associated with each of said extending legs and which are configured to abut in a biasing fashion inside closed perimeter edges configured in spaced apart upper end locations of said main support body, these located proximate to said front face and extending through said top ledges and defining apertures through which said legs are resistively and ratchet-adjustably mounted; and an angularly adjustable arm supporting component secured to a lower rear face location of the main support body and adjustable to establish a desired angle or tilt of the main support body and supported device.

2. The assembly as described in claim 1, said at least one top support ledge further comprising a pair of upper and opposite extending suspending supports provided by downwardly angled lips which respectively extend from said top ledges which extend in spaced apart fashion from top edges of said main support body in a direction away from said rear face.

3. The assembly as described in claim 1, each of said bottom and top support ledges further comprising an extending ledge portion terminating in an angled lip and exhibiting a generally "U" shape in cross section.

4. The assembly as described in claim 1, further comprising a spacing between each pair of said ribs being equivalent to an upper end thickness of said main support ledges.

5. The assembly as described in claim 4, further comprising each of said legs having a length dimension not exceeding a height of said main support body, such as in order to accommodate easy storage in the fully retracted position.

6. The assembly as described in claim 1, said angularly adjustable arm supporting component further comprising a pair of multi-positional arms separated by a crosswise extending base, a pair of support locations associated with said main support body exhibiting arcuate lobes extending from spaced apart and lower edge proximate locations of said rear face and to which said arms are pivotally secured.

7. The assembly as described in claim 6, each of said pivotally supported arms further comprising spaced apart mounting portions at base mounting ends, a pin extending between each pair of said mounting portions and which are mounted in coaxial fashion through a width extending recess in each of said lobes.

8. The assembly as described in claim 7, further comprising a plurality of ribbed locations configured in circumferentially offsetting fashion about a projecting arcuate edge of each of said lobes, end abutting locations of each leg being configured to seat against an arcuate portion separating each pair of circumferentially offset ribs.

* * * * *